United States Patent [19]

Morse

[11] Patent Number: 4,727,856

[45] Date of Patent: Mar. 1, 1988

[54] SOLAR WATER HEATING AND STORAGE SYSTEM

[76] Inventor: Dwain E. Morse, 3463 State St., Santa Barbara, Calif. 93105

[21] Appl. No.: 915,495

[22] Filed: Oct. 6, 1986

Related U.S. Application Data

[63] Continuation of Ser. No. 757,142, Jul. 22, 1985, abandoned.

[51] Int. Cl.$^4$ ................................................. F24J 2/04
[52] U.S. Cl. ..................................... 126/437; 126/435; 126/432
[58] Field of Search ..................... 126/437, 435, 432

[56] References Cited

U.S. PATENT DOCUMENTS

| | | | |
|---|---|---|---|
| 4,253,446 | 3/1981 | Müller | 126/435 |
| 4,269,167 | 5/1981 | Embree | 126/420 |
| 4,285,389 | 8/1981 | Horton | 165/1 |
| 4,324,228 | 4/1982 | Shippee | 126/437 |

*Primary Examiner*—Larry Jones
*Attorney, Agent, or Firm*—Stetina and Brunda

[57] ABSTRACT

An improved solar water heating and storage system is disclosed characterized by use of physically separated yet thermally interfaced solar collector and domestic water storage reservoirs. The reservoirs and conduit systems are designed to provide a thermal stacking effect of the solar fluid transfer medium and the domestic water supply to maximize system efficiency.

9 Claims, 4 Drawing Figures

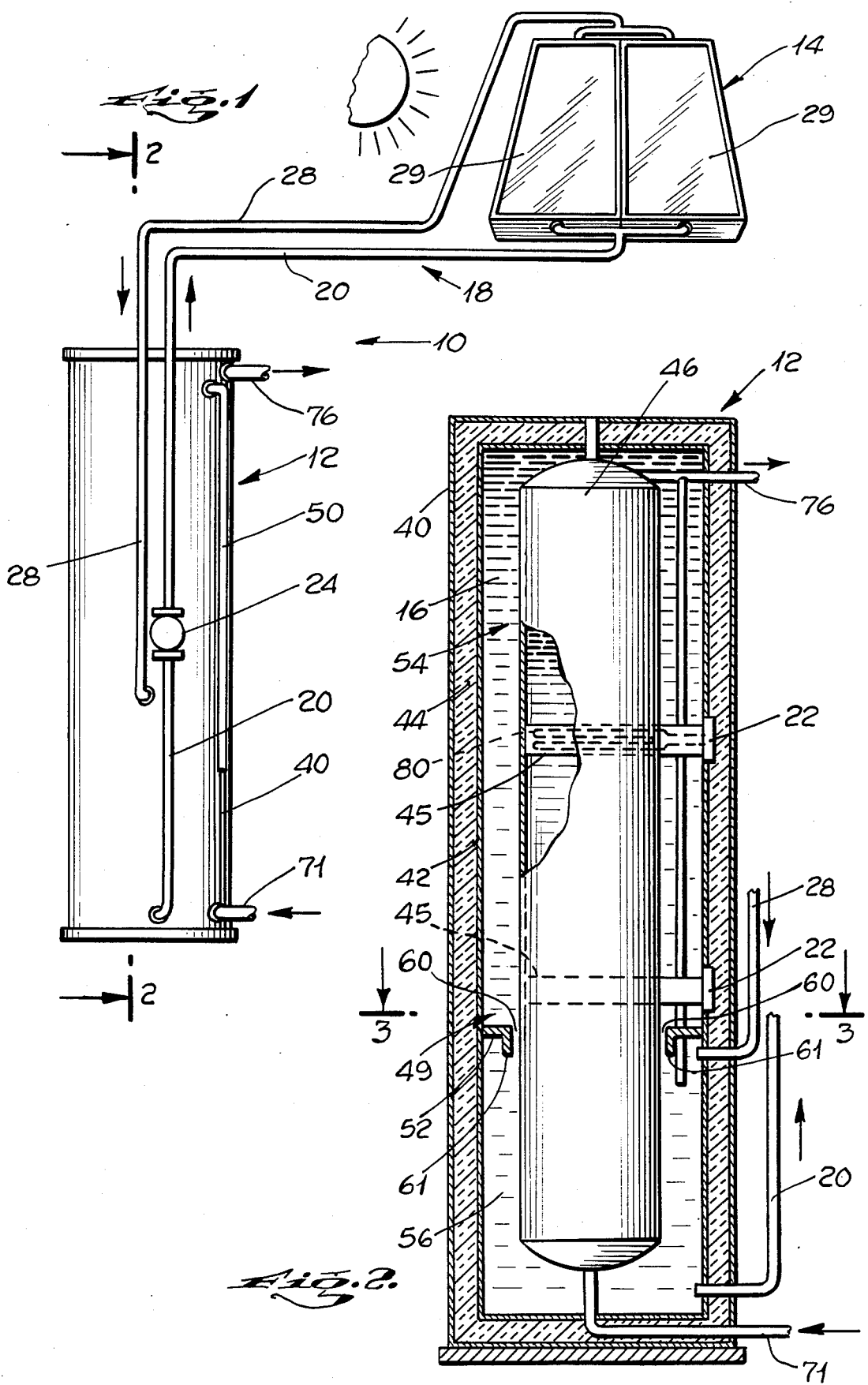

SOLAR WATER HEATING AND STORAGE SYSTEM

This application is a continuation of application Ser. No. 757,142, filed July 22, 1985, now abandoned.

BACKGROUND OF THE INVENTION

This invention relates generally to the field of solar energy collection and conversion systems and more specifically to an improved solar water heating and storage system which separates the conductive solar collector fluid medium from the domestic hot water supply in such a way as to maximize the solar collector efficiency and optimize the heating and storage of the domestic hot water supply.

In these times of energy consciousness, fueled by the increased costs of natural gas, petroleum by-products and electrical power, alternative means for heating domestic water supplies are desirable. Use of radiant solar energy to heat domestic water supplies is one such alternative means which has gained widespread use in the prior art. Generally, there are presently three types of prior art solar energy devices currently being utilized for heating domestic water (i.e. both commercial and residential) supplies. Each of these systems have the following elements in common; (1) a water supply to be heated; (2) a solar collector panel and (3) a tank to store the heated water. However, each of the presently available systems process various inherent deficiencies which have detracted from their acceptance in the market place.

The first general type of prior art solar energy system inputs residential water line directly into the solar collector panel. The heated efflux from the solar collector panel is collected and stored in a conventional domestic water heater. A pump and return line from the water heater back to the collector panels is additionally typically utilized to permit the solar reheating of the stored water if needed. The domestic water heater is therefore, both the solar collector storage reservoir and the domestic water reservoir for the solar system.

In a modification of the first general type of prior art solar energy heating system, a secondary or auxiliary storage tank is positioned between the solar collector and the conventional residential water heater. The water to be heated is pumped from the auxiliary storage tank to the solar collector panel, heated and then returned to the auxiliary storage tank. As hot water is drawn from the residential water heater, supplemental solar heated water is pumped into the residential water heater.

The second type of prior art solar heating system, is generally known as a thermal siphon-system, wherein the solar collector panels are physically situated at an elevation below the storage reservoir so that the heated water within the solar collector panels will naturally rise as a result of physical forces and return to the reservoir for storage. This particular type of system requires that the solar collector panels be placed at a lower elevation than the solar collector reservoir and hence can only be utilized in limited applications.

The third type of prior art solar energy heating system, another two-tank system, has separate reservoirs for domestic hot water and solar collector fluid. The domestic water to be heated is pumped from the domestic reservoir through a heat exchange coil located within the solar reservoir, and returned to the domestic reservoir. The solar reservoir fluid, cooled by the conductive transfer of heat to the domestic water via the heat exchange coil, is pumped from the solar reservoir to the solar collector panel, heated and then returned to the solar collector reservoir.

In this third type of prior art system with the two tanks thermally connected by a heat exchanger coil, the heat losses from the tank surfaces and the inefficiency of conventional heat exchange technology result in a significant reduction in the solar collector panel's performance.

In the first two general prior art systems, the water which is eventually used for domestic purposes is run directly through the solar collector panels. As such, a problem arises since, as the domestic water is heated, its solubility quotient decreases. This decrease in solubility results in deposition within the actual solar collector unit, of minerals carried in solution by the residential water supply. As a result of this mineral deposition, periodic cleaning or replacement of the solar collector panel is continually required. Furthermore, this deposition also contributes to a continually decreasing efficiency of the solar collector itself. Chemicals which could be used to prevent this mineral precipitation cannot be added to the water coursing through the collector since the water must still be potable.

Another problem with the first two general prior art systems is the fact that the general efficiency of the solar heating system is lowered since cold incoming water is constantly mixed with heated water. This reduces the temperature of the hot water out of the system, thus requiring secondary heaters to maintain the desired temperature levels. Furthermore, such mixing increases the temperature of the water going to the collectors, thus reducing the collector efficiency. In order to maximize the efficiency of the solar collector means itself, the lowest temperature fluid should be introduced into the solar collector, since the lower the influx fluid's temperature, the lower the radiation losses at the collector. Finally, the exposure of the heated domestic water supply to ambient temperatures maximizes the absorbed heat which is re-radiated and lost to the atmosphere. In conclusion, there is a need for a solar heating system which avoids these deficiencies in a convenient manner.

SUMMARY OF THE INVENTION

The present invention provides a very significant advance in the solar energy collection and conversion field, since it concurrently increases the efficiency of the solar collector means and the overall efficiency of the solar energy conversion system itself. This particular improved solar heating system operates extremely efficiently and incorporates novel elements to improve the same.

Fundamentally, these advantages are provided by maintaining separate, but thermally interfaced solar collector and domestic water systems and the use of thermal stacking principles in the storage of heated water.

More particularly, the present invention solves the aforementioned problems of the prior art by disclosing a unique structural solar water heating and storage system which incorporates five basic physical phenomena:

(1) Water becomes less dense as its temperature increases;

(2) Solar collectors become more efficient as the temperature differential between the collector influx and ambient temperature is reduced;

(3) Energy loss from hot water storage system is directly proportional to the surface area exposed to the ambient air;

(4) Warm water will "stack" or float on colder water; and (5) The narrower the column of water, the more stable and pronounced is the "stack".

In applying these principles to the particular problem involved, the present invention encloses a first domestic water storage tank. The mounting of the larger solar collector storage tank. The mounting of the tanks in a coaxial relationship creates a narrow-walled column or annulus into which the solar heated fluid medium is applied. Residential water is supplied solely to the interior storage tank and is heated by conduction between the solar heated fluid medium contained within the annulus of the second collector storage tank. As such, the residential hot water supply is physically isolated yet thermally interactive with the solar heated fluid medium traveling through the solar collector. Due to this isolation, the solar heated fluid medium can be chemically treated so as to eliminate mineral deposits forming on the collector panels without contaminating the domestic hot water supply.

The principles of "thermal stacking" are effected by the particular positioning of the inlet and outlet pipe openings within the solar collector reservoir and the utilization of a mechanical baffle. The mechanical baffle divides the solar collector reservoir into an upper and lower chamber of the collector reservoir. In addition, an L-shaped, axially extending flange on the baffle reduces the pysical mixing resulting from the physical reintroduction of heated fluid into the solar reservoir collector. By removing the fluid to be heated in the conventional solar collector unit from the bottom of the collector reservoir, returning the solar heated fluid at a point just below the flange equipted mechanical baffle, and using a directional flow system when returning the solar heated fluid to the solar reservoir causing a spinning action of the fluid in the lower chamber, the physical turbulence and resultant mixing caused by the reintroduction of the solar heated fluid medium into the solar collector reservoir is minimized and restricted to the lower chamber. As such, the baffle and its' flange limits the effects of turbulence, while the small annulus allows the absorbed radiant energy to pass by laminar flow, upward to the top of the solar reservoir's upper chamber. This thermal stacking effect is further accentuated by the co-axial placement of the domestic reservoir within the solar collector reservoir, which narrows the column of fluid to be effected within the solar reservoir. The final result is that the fluid at the top of the present inventions' solar storage reservoir is hotter than it would be in a system using prior art construction.

Similarly in the coaxially mounted thermally interfaced domestic water reservoir, the domestic water inlet placement at the bottom of said domestic reservoir and the removal of the heated domestic water from the top of the reservoir, likewise effects the principles of thermal stacking to result in a delivered water supply that is hotter than if present technology is utilized. Since both the solar collector system and the domestic water system use these principles, the maximum and most efficient heating of the domestic water supply is realized.

Finally, the removal of the fluid to be heated from the bottom of the solar collector reservoir increases the efficiency of the solar collectors' solar radiant energy transference to the solar collector fluid medium. By separating the solar collector reservoir effluent and influent openings as much as possible, the temperature differential of the water to be heated is maximized, increasing the efficiency of the solar energy collector.

DESCRIPTION OF THE DRAWINGS

These as well as other features of the present invention will become more apparent upon reference to the drawings herein:

FIG. 1 is a depiction of the domestic hot water solar heating system of the present invention.

FIG. 2 is a cross-sectional side view of FIG. 1 taken along the lines 2–2 of FIG. 1.

FIG. 3 is a cross-sectional view taken along the lines 3—3 of FIG. 2; and.

DETAILED DESCRIPTION OF THE PREFERRED EMBODIMENT

Figure 4:
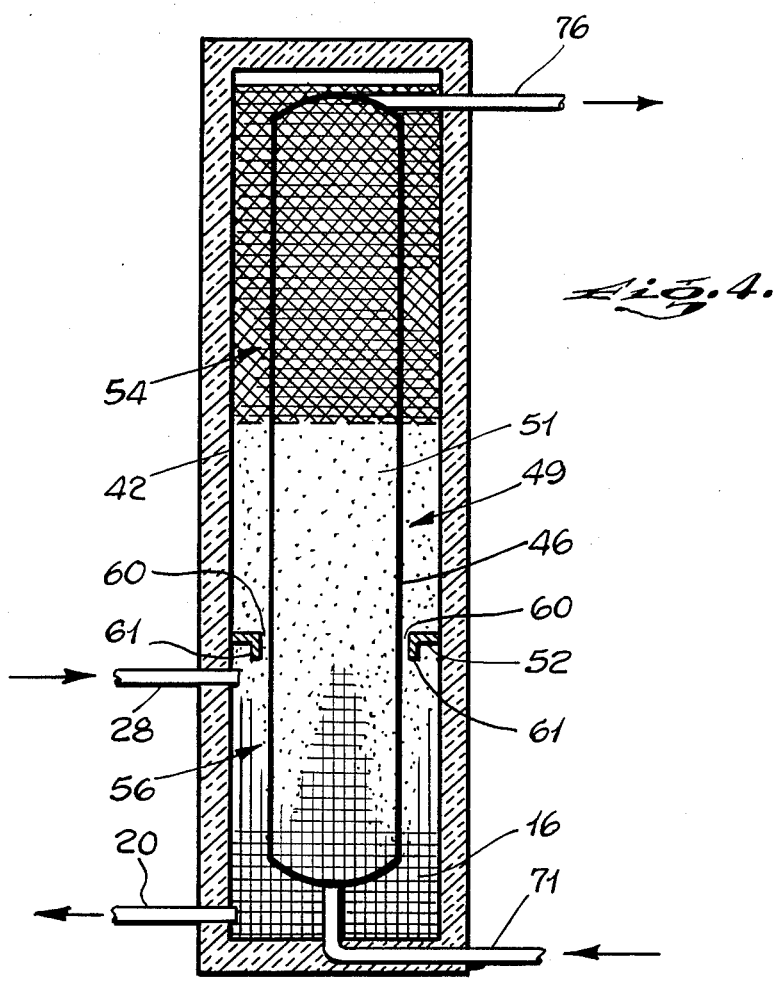
FIG. 4 is a simplified cross-sectional view depicting the thermal-stacking effects of the present invention.

Referring to FIGS. 1 and 2; there is shown the improved solar energy conversion system, designated generally by the numeral 10, of the present invention composed generally of a double-walled storage tank or reservoir, designated generally 12 utilized for storing both residential water and solar collector fluid transfer media in a physically isolated yet thermally interactive manner; a solar collector designated generally 14, for the heating of solar collector fluid transfer medium 16; and a conduit means, generally designated 18, for connecting the solar collector means 14 to the double-walled tank 12.

The double-walled tank 12, includes an effluent conduit 20, extending to the inlet of the solar collector 14 having a thermostat controlled pump assembly 24 disposed thereon. An influent conduit 28 extends from the solar collector 14 back to the tank 12. A fluid transfer medium 16 is circulated through the conduits 20 and 28 under the influence of the thermostat/pump assembly 24 to be solar heated at the solar collector 14. As is well known, this solar heating generally involves the impinging of incident radiant energy through transparent or translucent panels 29 of the collector 14 and the absorption of such energy by the transfer medium 16.

Figure 3:
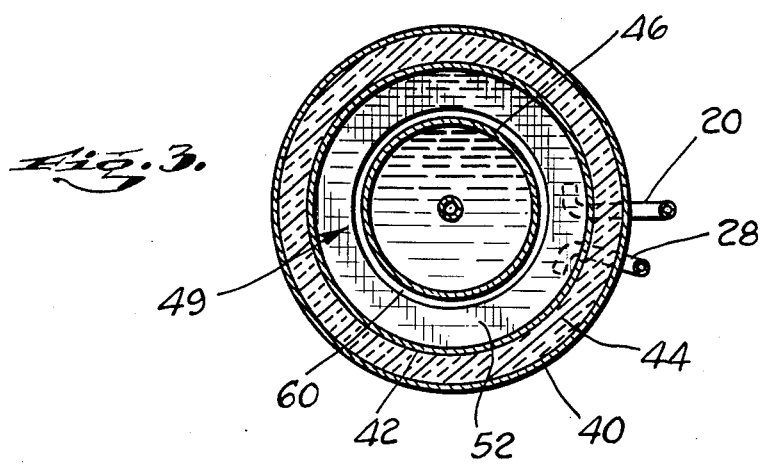

Referring now more particularly to FIGS. 2 and 3, the detailed construction of the improved double-walled tank 12 may be described. The tank 12 includes a cylindrical outer jacket or housing 40 with a coaxially mounted solar storage tank reservoir 42 enclosed within. Packed between the outer jacket and the solar storage tank 42 is a suitable quantity of thermal insulation material 44 which retards heat loss from the interior of the tank 42 to the environment. In the preferred embodiment a 3-inch thick poured closed cell Isocyanate foam is utilized as insulation material 44, but any equivalent insulation material can be utilized. Sealed within and coaxially mounted inside the solar storage tank 42 is a smaller second domestic water reservoir 46 utilized to store the domestic hot water supply. The cavity formed between the domestic water reservoir 46 and the outer cylindrical wall of solar storage tank 42 forms an annulus or annular column 49 which is utilized to store the solar collector fluid transfer medium 16. The collector fluid transfer medium 16, because of its physical separation or isolation from the domestic water supply contained within the reservoir 46, may include chemicals to inhibit or preclude normal mineral deposition within the solar collector 14 resulting from the decreased solubility of heated fluids. Excess solar collector transfer medium 16 within solar storage reservoir 42 may be expelled from the reservoir 42 and double-walled tank 12 via a solar tank overflow conduit 50, which has one end open to the solar storage reservoir 42, passes through the double-walled tank 12, and opens to the environment.

Disposed within the interior and adjacent the bottom of solar storage tank 42 is a baffle or partition means 52, which divides or segregates the solar storage reservoir 42 into an upper and lower chamber (54 and 56 respectively). This baffle 52 for dividing the solar reservoir 42 comprises an annular ring or plate which is mounted on its periphery to the tank 42 and extends radially inward toward the outer surface of the domestic water tank 46 terminating at a short distance spaced therefrom to define an annular gap or space 60. Depending downward and perpendicular from the baffle edge bordering the annular gap 60 is an axially disposed flange 61. Said flange 61 restricts, to the lower chamber 56, any eddying or turbulence caused by the spinning motion of the fluid 16 within the lower chamber 56, as more fully discussed infra. In the preferred embodiment, the baffle 52 is formed of fiberglass, but other materials may be substituted. As will be described in more detail infra, the baffle 52 and its depending flange 61 serves to retard rapid/turbulent axial flow of the fluid medium 16 upwrad within the reservoir 42 and thereby promotes thermal stacking effects within the reservoir 42. The solar storage reservoir effluent conduit 20 connects the solar storage reservoir 42 wih the solar collector 14 to enable the transfer medium 16 in the solar storage reservoir 42 to be transferred by thermostat controlled pump 24 to the solar collector 14. The opening to solar storage effluent conduit 20 within the solar collector reservoir 42 is positioned to remove the solar transfer medium 16 from the lowermost portion of the solar collector storage reservoir 42, where the medium is maintained at the coldest possible temperature. Similarly, the return conduit 28 is positioned to reintroduce the solar heated transfer medium 16, back into the solar storage reservoir 42, at a point below the baffle 52. More particularly, the return conduit 28 enters the reservoir 42, extends a short distance radially inward and then forms a perpendicular L-shaped bend so that the opening is tangentially disposed to the wall of reservoir 42. By such arrangement, a rotational spin about the circumference of the solar reservoir 42 is imparted by the re-entering heated fluid to the fluid already in the lower chamber 56. This rotation helps restrict the physical mixing to the lower chamber by imparting a directional rotational flow within the reservoir 42 and eddying currents from such flow are restricted to the lower chamber 56 by the depending flange 61 as discussed earlier. Similarly, the effluent conduit 20 enters the reservoir 42 and extends a short distance radially inward. In contrast to the return conduit 28, the effluent conduit 20 bends perpendicularly in an opposite direction so that the effluent conduit opening is facing the oncoming rotational flow of the collector fluid. By this arrangement, the effluent conduit opening scoops up the coldest solar transfer fluid traveling toward the effluent conduit opening at the bottom of the reservoir 42. Thus, this specific locational and directional placement of the heated solar transfer medium 16 into the solar storage reservoir 42 contributes to the present inventions thermal stacking ability as discussed infra.

As depicted in FIG. 2, an incoming domestic water supply conduit 71 is provided which connects the domestic water reservoir 46 with a domestic water supply source (not shown), the conduit 71 is disposed so that it passes through the outer jacket 40 but remains within the insulation material 44, by traveling substantially parallel to the bottom of the double-walled tank 12. This positioning minimizes the contact between the conduit 71 and the fluid transfer media 16 within the solar storage reservoir 28. Similarly, a domestic water outlet conduit 76 is provided which connects the interior of the reservoir 46 to the user plumbing system (not shown). As such, the domestic hot water supply 51 utilized from the system is physically isolated from the fluid transfer medium 16 yet thermally interactive with the fluid medium maintained within the reservoir 42.

Connected to a thermostat 22 and disposed within axial apertures 45 formed within the reservoir 46, are a pair of auxiliary electrical back-up heaters 80 (i.e. calrod heaters) preferably rated at 220 volts and 4500 watts. In the event that the water temperature within the reservoir 46 ever decays below a preset limit, the thermostat activates the operation of the heaters 80 to raise the fluid media 16 within the reservoir 42 to proper operational temperature.

In operation, the solar collector 14 is fixed and mounted by conventional means, usually in a direction facing directly south at an inclined angle from the horizon. As will be recognized, any conventional solar collector may be utilized in this application. When the temperature of the domestic reservoir water 51 maintained within the domestic water reservoir 46 falls below a desired preset temperature set on the thermostat 22, the pump 24 operation is initiated to transfer the lowest temperature fluid medium 16 from the lowermost portion of the reservoir 56 toward the collector 14. This cooler fluid transfer medium effluent flows out from the solar reservoir 42, through the double-walled tank 12 via effluent pipe 20, impelled by the action of the pump 24, to enter into and pass through the solar collector 14. The sun's radiant or solar energy heats the solar collector transfer medium 16 by well known principles, with the heated fluid medium returning to the solar storage reservoir 42 via return conduit 28. As will be recognized, due to the lowest temperature fluid medium 16 being constantly supplied first to the collector 14, the thermal efficiency of the solar collector 14 is maximized.

Referring more specifically to FIG. 4, as the heated solar effluent transfer medium 16 flows, back into the solar storage reservoir 42 at a point beneath the baffle means 52, the tangential orientation of the collector return opening imparts a rotational flow to the fluid about the circumference of lower chamber 56. Eddying currents and turbulence is prevented from disturbing the fluid contained in the upper chamber 54 by the flange 61 depending from annular partition means 52. Thus, initial physical turbulent flow mixing of the hotter returning fluid medium 16 from the collector 14 with the cooler fluid medium contained within the reservoir 42 is maintained. This mixing is illustrated by the interspersed cross hatchings at the bottom of reservoir 42 in FIG. 4. As the mixing continues, the hotter fluid medium 16 flows through the annular space 60 formed between the baffle 52 and the inner reservoir 46 into the upper chamber 54 due to the physical properties of higher temperature fluids being less dense than lower temperature fluids. In addition, due to the annular space 60 being relatively small, this upward migration of the hotter fluid medium comprises slow, laminar flow, resulting in thermal gradients being established axially throughout the elevation of the upper chamber 54 with the hottest fluid medium being maintained at the uppermost elevation within the upper chamber of the reservoir 42. This axial thermal gradient is known as "thermal stacking" which is further accentuated due to the relatively small volume of fluid medium maintained in the annular column 49 of the upper chamber 54. The cumulative effect of this thermal stacking results in the hottest transfer medium being maintained adjacent to the top of the solar collector reservoir 42. Since the solar transfer fluid 16 is at all times wholly separate from the domestic water 51, salts or other chemicals which may accentuate this gradient effect may also be used in the fluid medium 16.

Continuously throughout the solar heating and storage of the fluid medium 16 within the reservoir 42, conductive heat transfer from the fluid medium 16 into the water 51 contained within the reservoir 46 is occurring which raises the temperature of the water 51 maintained within the reservoir 46. In this regard, the reservoir 46 is preferably formed of a material having maximum conductive heat transfer properties to optimize the exchange of heat from the fluid medium 16 to the water 51 maintained within the reservoir 46.

It will additionally be noted that due to the thermal stacking occurring with the reservoir 42, the greatest heat transfer to the water 51 maintained within the reservoir 46 occurs in the uppermost region of the reservoir 46. Further, due to the outlet conduit 76 being positioned at the uppermost location of the reservoir 46, water withdrawn from the reservoir for consumption by the domestic user is always insured to be at the highest temperature within the reservoir 46. As will be recognized as the hot domestic water is withdrawn from the reservoir 46, additional cold make-up water from the main water supply is brought into the lowermost region of the reservoir 46 through the conduit 71.

The operation of the pump 24 will continue until such time as the temperature of the water 51 maintained within the reservoir 46 rises to a preset maximum thermostat level. Subsequently, pump operation will be cycled as necessary and dependent primarily upon the amount of hot water usage of the system. In those few instances wherein the temperature of the water 51 is below the minimum preset thermostat value and environmental conditions prevent the heat of the fluid medium 16 to necessary temperature values, the thermostat automatically energizes the pair of heating elements 80 disposed within the apertures 45 formed through the reservoir 46 to heat the fluid medium 16 to proper operating temperatures necessary to transfer heat to the water 51 maintained within the reservoir 46.

In conclusion, the application of thermal stacking principles to both the solar collector reservoir 42 and domestic water reservoir 46 maximizes system efficiency and transverses deficiencies of prior art systems.

Although one preferred embodiment of the present invention is specifically illustrated and described herein, it will be appreciated that many modifications and variations of the present invention are possible in light of the above teachings and within the purview of the pending claims without departing from the spirit and the intended scope of the invention.

What is claimed is:

1. An improved solar water heating system for use with a solar collector comprising:
   a first tank defining
      a first reservoir storing a fluid transfer medium therein,
      an ingress port receiving the fluid transfer medium from the solar collector into the tank at a point dividing the tank into upper and lower portions, and
      an egress port returning the fluid transfer medium to the solar collector from a point within the lower portion of the tank;
   a second tank defining a second reservoir enclosed within the first tank and storing a quantity of domestic water therein;
   means for turbulently circulating the fluid transfer medium from the ingress port through the first reservoir lower portion turbulently across the second tank to the egress port so as to by the turbulent circulation aid heat transfer between the first reservoir and the second reservoir; and
   a baffle in the first reservoir above the ingress port, which baffle substantially isolates the turbulently circulating fluid transfer medium within a lower portion of the first reservoir below the baffle from an upper portion of the first reservoir above the baffle, the baffle allowing only a small circulation of the fluid transfer medium from the first reservoir upper portion above the baffle to the first reservoir lower portion below the baffle, the small circulation substantially transpiring only as laminar flow over the second tank.

2. The improved apparatus of claim 1, wherein said first tank is cylindrical,
   wherein said second tank is cylindrical and is coaxially positioned within said first tank, and
   wherein said first reservoir is in the form of an annular column.

3. The improved apparatus of claim 2, wherein said baffle comprises an annular ring rigidly connected about its periphery to said first tank and extending radially toward said second tank and having an axially extending flange at its inner edge extending downwardly into said lower portion of said annular column.

4. The improved apparatus of claim 2, wherein said means for turbulently circulating comprises:
   a first conduit extending from the ingress port into the annular column first reservoir in a first direction substantially along a chord of the annulus for supplyng the fluid transfer medium in a turbulent flow circularly around said cylindrical second tank;
   a second conduit extending from the egress port into the annular column first reservoir in a second direction substantially along a chord of the annulus in an opposite sense to the first direction for intercepting the fluid transfer medium in its turbulent circular flow around the second tank and for channeling the fluid transfer medium to the egress port; and
   a pump external to the first tank connected to the ingress port and to the egress port for driving fluid from said ingress port to said egress port.

5. The improved apparatus of claim 5, wherein said second tank is formed of stainless steel.

6. The improved apparatus of claim 3, wherein said annular ring is sized to define an annular gap between said ring and said second tank through which the laminar flow of the fluid transfer medium is permitted axially over the second tank.

7. The improved apparatus of claim 3, wherein said annular ring is formed of fiberglass.

8. An improved method for the thermal heat exchange of solar heated fluid transfer media to heat domestic water comprising the steps:

storing a quantity of fluid transfer medium in a generally cylindrical first tank;

storing a quantity of domestic water in a generally cylindrical second tank, coaxially positioned within the first tank to physically isolate the fluid transfer medium from the domestic water yet permit thermal interaction through the walls of said second tank of said domestic water with said fluid transfer medium;

transferring from an outlet port at the lower portion of said first tank a lowest temperature portion of said fluid transfer medium within said first tank from said first tank to a solar collector for solar heating of said fluid transfer medium;

returning said solar heated fluid transfer medium back into said first tank at an inlet port at the middle portion of said first tank, said returning being so as to maximize turbulent circulation of the fluid transfer medium within the first tank and over the walls of the second tank, said circulation occurring within a first region of the first tank between the inlet port and the outlet port;

isolating the turbulent circulation of the fluid transfer medium occuring within the first region from a second region within an upper portion of the first tank by emplacing a baffle in the general form of an annular ring between the generally cylindrical first tank and the generally cylindrical second tank at a location above the inlet ports, the baffle seperating the turbulent-circulation first region from the second region, the isolating by emplacing a baffle serving to minimize turbulance and maximize defusive thermal effects of thermal stacking in the second region.

9. A double tank apparatus for exchanging heat between fluid transfer media heated in a solar collector and domestic water for use in domestic applications, the apparatus comprising:

an outer tank chamber;

a closed inner tank chamber, said closed inner chamber disposed coaxially within said outer chamber and sized to define a narrow annular column between said inner and outer chambers;

an annular ring disposed above the lower portion of the outer chamber, said ring extending from the inside surface of the outer chamber towards said closed inner chamber to define an annular gap between said chambers segregating said narrow annular column into upper and lower portions;

an inner chamber inlet conduit entering into said inner chamber connecting a lower portion of the inner chamber with a domestic water source;

an inner chamber outlet conduit extending from a top portion of the inner chamber to a domestic water system;

an outer diameter inlet conduit joining the solar collector and said outer chamber at a location below said annular ring;

an outer chamber outlet conduit, disposed below said outer chamber inlet conduit, joining the solar collector and said outer chamber to remove the fluid transfer medium from the bottom of said outer chamber for entry into the solar collector;

turbulently circulating means for circulating the fluid transfer medium in a closed path from the outer chamber inlet conduit with a directional rotational flow and with eddying currents turbulence through the annular column lower portion to the outer chamber outlet conduit and then through the solar collector and back to the outer chamber inlet conduit;

wherein the annular ring isolates turbulent flow of said heat transfer medium to be within the annular column lower portion and permits laminar flow between said upper and lower portions of said angular column through said gap by thermal migration;

wherein thermal stacking of said heat transfer medium within said annular column upper portion is effectuated.

* * * * *